Feb. 16, 1943.   M. E. HANSEN   2,311,617
METHOD AND APPARATUS FOR MAKING THICK LATEX RUBBER SHEETING
Filed April 22, 1941
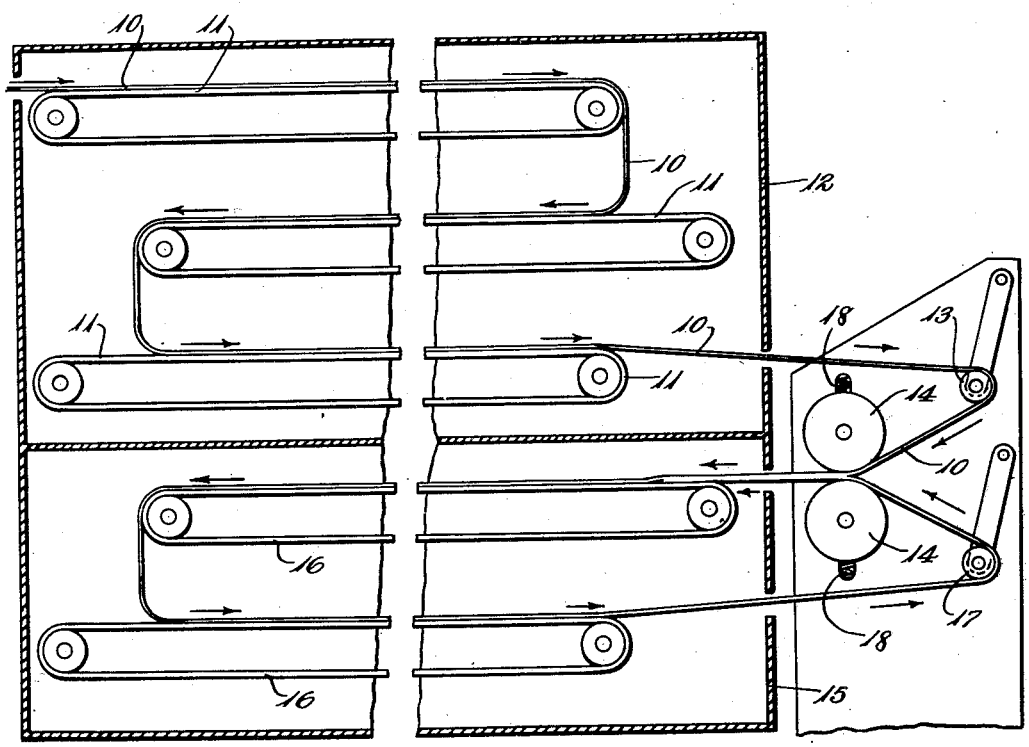
Inventor
Merrill E. Hansen
By Willie F. Avery
Atty Patented Feb. 16, 1943

2,311,617

UNITED STATES PATENT OFFICE 2,311,617

METHOD AND APPARATUS FOR MAKING THICK LATEX RUBBER SHEETING

Merrill E. Hansen, Silver Lake, Ohio, assignor to American Anode Inc., Akron, Ohio, a corporation of Delaware Application April 22, 1941, Serial No. 389,727

13 Claims. (Cl. 18—2)

This invention relates to a method and apparatus for producing long lengths of latex rubber sheeting and more particularly to the manufacture of such sheeting having such a relatively great thickness as to preclude economical and efficient manufacture of the sheeting by direct deposition from latex according to conventional methods.

Large numbers of self-sealing or so-called "bullet-proof" gasoline tanks are now being manufactured in this country for use in war planes and other craft which may be subjected to gun fire. In the type of self-sealing tank now being used most extensively, the sealing means includes one or more layers of unvulcanized latex rubber sheeting in the neighborhood of $\frac{1}{16}$ to $\frac{1}{8}$ inch thick. Because of the large quantities of such sheeting needed, it is of vital importance that it be manufactured rapidly and this requires the use of continuous production processes. Relatively thin latex rubber sheeting may be produced very efficiently and economically by direct deposition from latex through the use of coagulants or through the use of electro-deposition methods. On the other hand, such methods are slow, uneconomical and practically prohibited for making relatively thick sheeting directly from latex because of the excessive time required to build up a deposit of the required thickness. Also, it is extremely difficult to remove all the water from such a thick sheet of latex rubber. Attempts have been made to ply up thin latex rubber sheeting according to conventional methods used in plying up ordinary mill-mixed and masticated rubber sheeting, but such expedients have not proved satisfactory because of the different properties of latex rubber and particularly because of the fact that latex rubber is much less tacky than ordinary mill-masticated rubber.

After considerable experimentation, however, I have succeeded in devising a method and apparatus through which I can successfully ply up relatively thin sheets of latex rubber to produce the required relatively much thicker sheet. According to the present invention, I produce a continuous, relatively thin sheet of water-containing latex rubber coagulum according to any appropriate continuous production method. I then subject the continuous sheet to heating continued over a relatively long period of time and in the course of such heating effect progressive plying up of the sheet to the required thickness by doubling the sheet upon itself and causing it to travel in a closed loop as successive plies are built on. Periodically, when the closed loop has built up to the required thickness, it is cut and then severed from the single ply sheet and the plying up operation is started anew. I thus provide for the continuous production of a single-ply sheet of relatively thin latex rubber, for progressive plying up of the sheet to the required multi-ply thickness, and for intermittent removal of the multi-ply sheet, all without interrupting the continuous production of the single-ply sheet. Superior cohesion between the plies is assured by maintaining the rubber within a controlled temperature range during the plying operation.

The invention will now be described in greater detail with reference to the accompanying drawing of which the single figure is a side elevation of apparatus appropriate for carrying out the present invention, the apparatus being shown in diagrammatic form and portions thereof being shown in vertical section.

The single-ply sheet of water-containing latex rubber coagulum may be prepared by any of the many well-known methods. It has been found, however, that the method and apparatus described and claimed in my issued Patent No. 2,147,293 and in my copending application Serial No. 247,044, filed December 21, 1938, now Patent No. 2,241,814, constitute an unusually satisfactory means of producing the required sheet in a progressive continuous fashion. Such apparatus for producing the water-containing sheet of latex coagulum accordingly has not been shown in the drawing and will not be described in detail but is incorporated herein by the foregoing references to my prior patents.

Referring to the accompanying drawing, the numeral 10 indicates a sheet of water-containing latex rubber coagulum desirably produced according to the method of my prior patents, the sheet preferably having been washed but not substantially dried. Usually the sheet will be in an unvulcanized state. The sheet 10 is transported by a series of pervious belt conveyors 11—11 arranged within a heating chamber 12. The length of the conveyors 11—11, their rate of travel, and the temperature in the heating chamber preferably are so correlated as to effect removal of substantially all the water from the sheet of rubber coagulum 10 in the course of its travel through the heating chamber 12. In any event, the major part of the water should be removed from the sheet at this stage. It should be understood, however, that a small amount of residual water will remain in the rubber even after thorough drying, and any reference herein to removing substantially all the water from the sheet should be taken not to exclude operations in which the sheet is thoroughly dried in the ordinary practical sense even though, for example, one or two percent of residual water may still remain in the rubber.

The substantially dried sheet 10 is then led from the heating chamber 12, directed about a guide roll 13, and thence between a pair of presser rolls 14—14 arranged closely adjacent to the end of the heating chamber 12 so that the rubber sheet 10 will still be quite warm from the heat-drying at the time it is fed between the presser rolls. The sheet 10 is then directed from the presser rolls into a second heating chamber 15 and is conveyed through the chamber 15 by means of additional belt conveyors 16—16 which preferably have substantially the same length as the conveyors 11—11. The sheet 10 is caused to travel through a relatively long loop inside the chamber 15 and is then led therefrom about a guide roll 17 and directed back into the bite of the presser rolls 14—14 where it is pressed into intimate cohesive engagement with the portion of the sheet 10 then entering the bite of the rolls. It is thus seen that a long closed loop of rubber sheeting is formed. The sheet is allowed to travel about this closed loop until the required total thickness is built up by successive application of the single ply sheet by means of the presser rolls. The spacing between the presser rolls 14—14 may be varied by means of hand-operated adjusting screws 18. This spacing should be increased an amount slightly less than the thickness of the single ply sheet 10 each time the beginning of the loop enters the presser rolls in order to maintain substantially uniform pressure throughout the plying operation. Automatically controlled means for varying the roll spacing in accordance with the thickness and travel of the sheet may be attached if desired. Conveniently, the upper roll may simply be allowed to ride or float on the lower roll and the interposed rubber sheet, the weight of the upper roll serving to maintain the required uniform pressure.

During the plying operation the temperature in the chamber 15 is maintained preferably at about 150° F. although this temperature may be varied in particular cases anywhere from about 120° F. to 180° F. In no event, however, should the temperature in the chamber 15 be higher than 212° F. and generally it should be substantially lower than 212° F. in order to avoid any possibility of "blowing" resulting from rapid vaporization of residual water in the sheet.

When the plied-up sheet in the continuous loop has reached the required total thickness, the loop is cut, preferably substantially at the beginning point of the loop, and the plied-up sheet is progressively removed from the apparatus. When the end of the plied-up portion is reached, it is severed from the single-ply portion of the sheet, and the single ply portion is then fed back between the presser rolls 14—14 and the plying operation is repeated. Such cutting and severing, of course, ordinarily will be effected in the short reach of the sheet extending outside the heating chamber 15 after the final (lowermost) passage therethrough. It is thus seen that the single-ply sheet is progressively plied-up to the required multi-ply thickness and the multi-ply sheet is intermittently detached from the single-ply sheet and removed from the apparatus, all without in any way interrupting or interfering with the continuous production of the initial single-ply sheet.

To secure best cohesion between the various plies of the rubber sheet, it is important to observe the heating conditions which have been outlined above. In order that these conditions may be more fully understood, a typical installation suitable for commercial operation will be described in somewhat greater detail. In such an installation, five conveyor belts are arranged substantially as indicated diagrammatically in the drawing. Each conveyor belt is 75 feet long. The rate of travel of the belts is approximately 7 feet per minute. The rubber sheet accordingly is maintained in the heating chamber 12 in the neighborhood of 30 minutes. The temperature in this chamber is not critical but preferably should be sufficiently high to effect thorough drying of the rubber. Temperatures in the neighborhood of 225° to 235° F. are quite satisfactory. To continue, the rubber sheet will be maintained in the second heating chamber 15 for approximately 20 minutes for each ply which is built on the multi-ply sheet. The temperature maintained in this chamber is of considerable importance and, as indicated above, preferably should be above room temperature and in the neighborhood of 150° F. with ordinarily permissible variations from 120° to 180° F. But in no event should the temperature in the chamber 15 be higher than 212° F. and generally it should be substantially lower than 212° F.

A typical self-sealing gasoline tank requires unvulcanized latex rubber sheeting ⅛ inch thick. Such sheeting is produced according to the present invention by continuously producing a single-ply water-containing sheet of such thickness as to yield a dried rubber sheet substantially .025 inch thick. This single-ply sheet is then plied-up to a total of five plies which give the required total thickness of .125 inch, equal to the required ⅛ inch. Such operation permits rapid and economical production of the sheeting, as single ply sheeting .025 inch thick may be produced with maximum efficiency and economy by the continuous production methods hereinabove referred to.

In an alternative and somewhat less desirable procedure, the single-ply sheet of dried latex rubber may be plied-up substantially in the manner hereinabove described but without heating the sheet during the plying operation in the fashion described. In such alternative procedure, the requisite adhesion between the plies may be secured by spraying or otherwise applying any suitable rubber adhesive between the two plies of rubber sheeting as they enter the bite of the presser rolls 14—14. Rubber cement or an adhesive latex composition may be used for this purpose.

The finished multi-ply sheet may be treated in any suitable fashion as by dusting with finely-divided soapstone, rolling in a liner, etc. If a vulcanized sheet is desired the unvulcanized sheet may be subjected to any conventional vulcanizing treatment. The principles of the invention may be employed in making latex rubber sheeting from all types of latex including natural rubber latices, artificial latices containing natural rubber and artificial latices containing synthetic rubbers. Numerous other modifications and variations may be effected in details of the apparatus and procedure hereinabove described without departing from the spirit and scope of the invention as defined by the appended claims.

I claim:

1. The method of making latex rubber sheeting of relatively great thickness which comprises progressively producing a continuous sheet of water-containing latex rubber coagulum of such thickness as to yield a dried rubber sheet having only a fraction of the desired thickness, immediately causing the said sheet to travel along a determinate path, heat-drying the sheet in the course of such travel until substantially all the water has been driven therefrom, and then plying up the sheet to the full desired thickness by progressively doubling and pressing the dried sheet upon itself as it travels in a closed loop of substantial length, the plying-up operation being effected while the single-ply sheet is still warm from the heat-drying and the plied-up sheet being subjected to additional heating at a temperature of from 120° to 180° F. during the plying operation, thereafter cutting the loop, severing the plied-up sheet from the single-ply sheet, and repeating the plying-up operation on the single-ply sheet, all said operations being performed without interrupting the progressive production of the initial continuous sheet.

2. The method of making latex rubber sheeting of relatively great thickness which comprises progressively producing a continuous sheet of water-containing latex rubber coagulum of such thickness as to yield a dried rubber sheet having only a fraction of the desired thickness, heat-drying the sheet to remove at least a major part of the water therefrom, and then plying up the sheet to a desired thickness by progressively doubling and pressing the dried sheet upon itself as it travels in a closed loop of substantial length, the plying-up operation being effected while the single-ply sheet is still warm from the heat-drying and the plied-up sheet being subjected to additional heating at a temperature substantially below 212° F. during the plying operation, thereafter cutting the loop, severing the plied-up sheet from the single-ply sheet, and repeating the plying-up operation on the single-ply sheet, all said operations being performed without interrupting the progressive production of the initial continuous sheet.

3. The method of making latex rubber sheeting of relatively great thickness which comprises producing a continuous sheet of water-containing latex rubber coagulum of such thickness as to yield a dried rubber sheet having a thickness only a fraction of the desired thickness, heat-drying the sheet until substantially all the water has been driven therefrom, progressively plying up the dried sheet to a desired thickness while the single-ply sheet is still warm from the heat-drying, and subjecting the plied-up sheet to additional heating at a temperature of from 120° to 180° F. during the plying operation.

4. The method of making latex rubber sheeting of relatively great thickness which comprises producing a continuous sheet of water-containing latex rubber coagulum of such thickness as to yield a dried rubber sheet having a thickness only a fraction of the desired thickness, heat-drying the sheet until at least a major part of the water has been driven therefrom, progressively plying up the dried sheet to a desired thickness while the single-ply sheet is still warm from the heat-drying, subjecting the plied-up sheet to additional heating at a temperature substantially below 212° F. during the plying operation, and severing the plied-up sheet from the single-ply sheet, all said operations being performed without interrupting the progressive production of the initial continuous sheet.

5. The method of making latex rubber sheeting of relatively great thickness which comprises producing a continuous sheet of water-containing latex rubber coagulum of such thickness as to yield a dried rubber sheet having a thickness only a fraction of the desired thickness, heat-drying the sheet until at least a major part of the water has been driven therefrom, plying up the dried sheet to a desired thickness, and maintaining the sheet at a temperature of from 120° to 180° F. during the plying operation.

6. The method of making latex rubber sheeting of relatively great thickness which comprises producing a continuous sheet of water-containing latex rubber coagulum of such thickness as to yield a dried rubber sheet having a thickness only a fraction of the desired thickness, heat-drying the sheet in a progressive fashion until at least a major part of the water has been driven therefrom, progressively plying up the dried sheet to a desired thickness, maintaining the sheet at a temperature substantially higher than room temperature but not above 212° F. during the plying operation, and thereafter severing the plied-up sheet from the single-ply sheet, all said operations being performed without interrupting the progressive production of the initial continuous sheet.

7. The method of making latex rubber sheeting which comprises progressively producing a continuous sheet of water-containing latex rubber coagulum, heat drying the sheet, plying up the sheet to a desired thickness by progressively doubling and pressing the dried sheet upon itself as it travels in a closed loop of substantial length, the plying-up operation being performed while the single-ply sheet is still warm from the heat-drying operation, and severing the plied-up sheet from the single-ply sheet, all said operations being performed without interrupting the progressive production of the initial single-ply sheet.

8. Apparatus for receiving a preformed continuous sheet of water-containing latex rubber coagulum which normally would yield a relatively thin sheet of finished rubber and for producing therefrom a relatively thick sheet of rubber, said apparatus comprising, in combination, means for causing a preformed sheet of water-containing latex rubber coagulum to travel in a continuous fashion along a determinate path, heat-drying means for removing water from the said sheet in the course of such travel, plying means disposed closely adjacent to the heat-drying means for progressively plying up the dried sheet while it is still warm from the heat-drying, and means for heating the plied-up sheet during the plying operation.

9. Apparatus for receiving a preformed continuous sheet of water-containing latex rubber coagulum which normally would yield a relatively thin sheet of finished rubber and for producing therefrom a relatively thick sheet of rubber, said apparatus comprising, in combination, a travelling conveyor for progressively transporting a sheet of water-containing latex rubber coagulum, means for heating the sheet during such transportation, a pair of presser rolls located adjacent one end of the conveyor, means for directing the sheet between said presser rolls, a second travelling conveyor adapted progressively to transport the sheet from said rolls, means for heating the sheet during such transportation from the rolls, and means for again directing the sheet between the presser rolls for plying.

10. Apparatus for receiving a preformed continuous sheet of water-containing latex rubber coagulum which normally would yield a relatively thin sheet of finished rubber and for producing therefrom a relatively thick sheet of rubber, said apparatus comprising, in combination, means for drying the sheet of water-containing coagulum, means for subsequently heating the dried sheet, and means for plying up the sheet after the drying but before the subsequent heating.

11. Apparatus for receiving a preformed continuous sheet of latex rubber coagulum and for producing a thicker sheet therefrom, said apparatus comprising, in combination, means for progressively transporting the sheet of coagulum along a path of substantial length, means for heating said sheet in the course of such travel, and means along said path at a position preceding the end of the heating region for plying up said sheet to a desired thickness.

12. Apparatus for producing a relatively thick rubber sheet from a preformed relatively thin rubber sheet, said apparatus comprising, in combination, means for progressively receiving a preformed continuous sheet of rubber material, means for causing the sheet to travel progressively in a looped path of considerable length, means for progressively plying-up the sheet to a desired thickness as it travels in said looped path, and means for treating the sheet in the course of such plying operation to promote adhesion between the plies.

13. The method of making latex rubber sheeting of relatively great thickness, which comprises progressively producing a continuous sheet of water-containing latex rubber coagulum of such thickness as to yield a dried rubber sheet having only a fraction of the desired thickness, drying the sheet in a progressive manner, directing the dried sheet through a looped path and bringing the end thereof into cohesive relation with a following portion of the sheet to form a closed loop, causing the loop to travel progressively through the looped path while laying thereon additional plies of the sheet until a desired total thickness has been built up, then severing the multi-ply sheet from the single-ply sheet, and repeating the plying-up operation on the single-ply sheet, all said operations being performed without interrupting the progressive production of the single-ply sheet.

MERRILL E. HANSEN.